United States Patent [19]

Shutterly

[11] Patent Number: 4,641,373

[45] Date of Patent: Feb. 3, 1987

[54] T-CONNECTION FIBER-OPTIC REPEATER

[75] Inventor: Harold B. Shutterly, Edgewood Boro, Pa.

[73] Assignee: Westinghouse Electric Corp., Pittsburgh, Pa.

[21] Appl. No.: 698,333

[22] Filed: Feb. 5, 1985

[51] Int. Cl.[4] .............................................. H04B 9/00
[52] U.S. Cl. ..................... 455/601; 455/607; 455/612
[58] Field of Search ................ 455/601, 606, 607, 612

[56] References Cited

U.S. PATENT DOCUMENTS

| | | | |
|---|---|---|---|
| 4,027,153 | 5/1977 | Käch | 455/612 |
| 4,112,293 | 9/1978 | Käch | 455/612 |
| 4,227,260 | 10/1980 | Vojvodich et al. | 455/601 |
| 4,233,589 | 11/1980 | Rawson et al. | 455/612 |
| 4,246,475 | 1/1981 | Altman | 455/612 |
| 4,366,565 | 12/1982 | Herskowitz | 455/612 |
| 4,406,513 | 9/1983 | Raphael | 455/601 |
| 4,449,247 | 5/1984 | Waschka, Jr. | 455/601 |
| 4,457,581 | 7/1984 | Johnson et al. | 455/612 |

FOREIGN PATENT DOCUMENTS

| | | | |
|---|---|---|---|
| 56-25845 | 3/1981 | Japan | 455/601 |
| 58-120330 | 7/1983 | Japan | 455/607 |
| 59-17743 | 1/1984 | Japan | 455/612 |

Primary Examiner—Joseph A. Orsino, Jr.
Attorney, Agent, or Firm—Daniel C. Abeles

[57] ABSTRACT

A T-connection fiber-optic repeater is used in a fiber-optic network wherein the repeaters are connected by optical fibers to other repeaters and the repeaters are also connected to stars, in such a manner that an optical signal can move from repeater to repeater without having to traverse a star. Each repeater includes optical receivers for receiving optical signals from the adjacent repeaters and from a nearby star and optical transmitters for emitting optical signals to the adjacent repeaters and the nearby star. Since signal reflections from the nearby star arrive almost immediately after signals from the adjacent repeaters, an inhibit circuit is used to gate signals from the nearby star when signals are being received from either of the adjacent repeaters. This avoids instability arising from repeated signal reflection without imposing a significant time delay as reflected signals propagate through long lengths of fiber. Modified embodiments permit a repeater to support more than one nearby star or to be used in a branching fiber-optic network.

26 Claims, 13 Drawing Figures

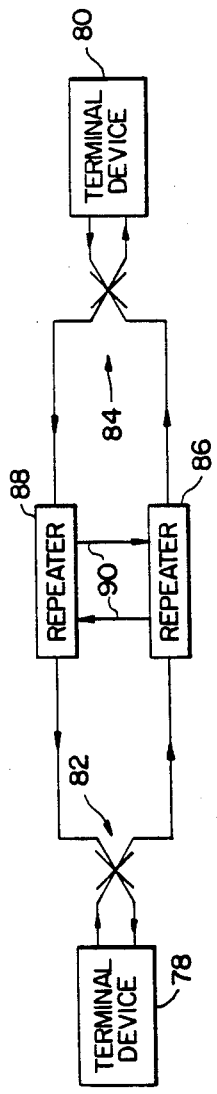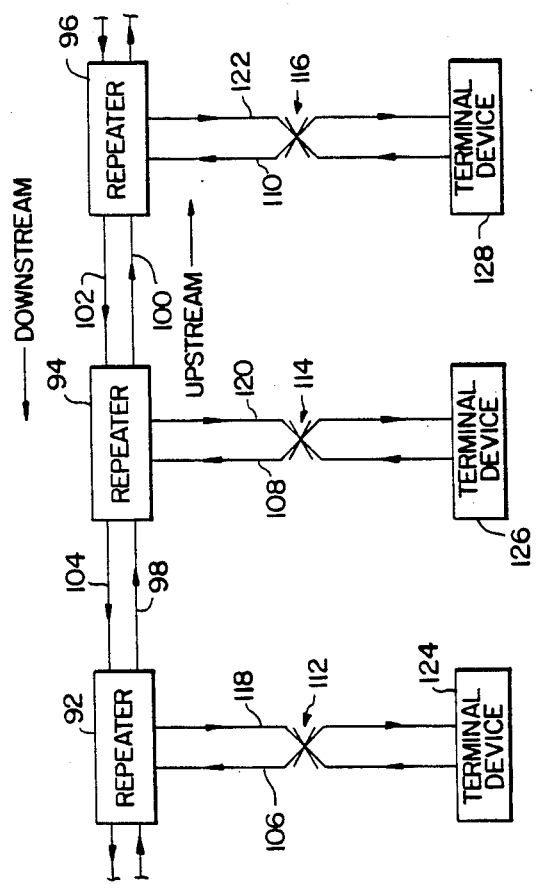

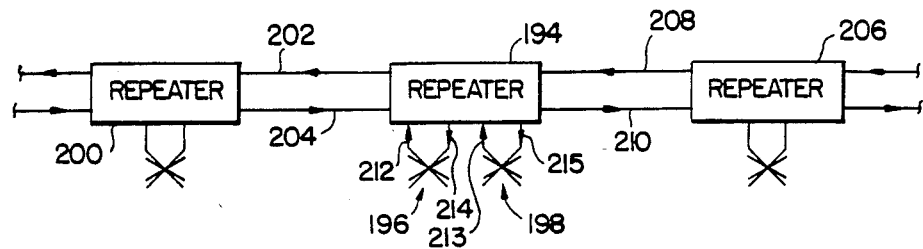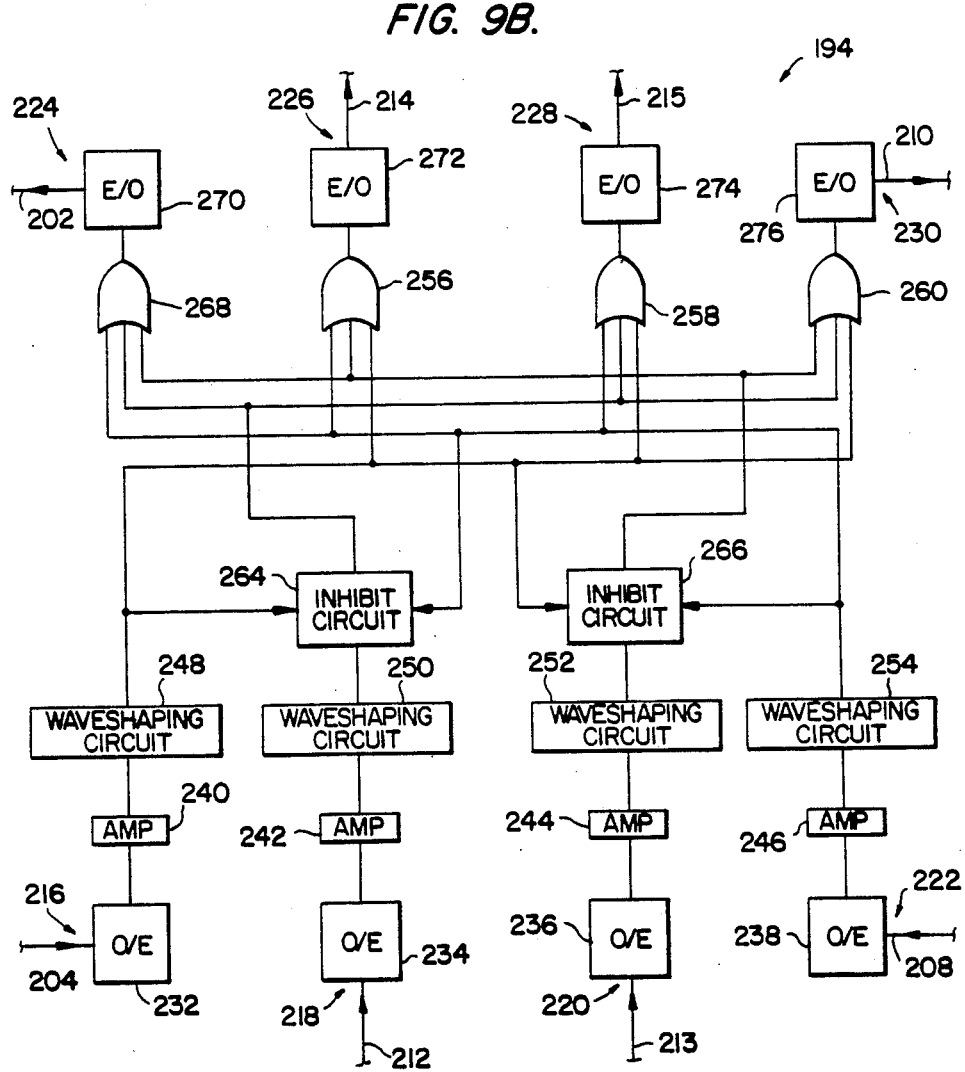

T-CONNECTION FIBER-OPTIC REPEATER

BACKGROUND OF THE INVENTION

The present invention is directed to a fiber-optic repeater, and more particularly to a T-connection fiber-optic repeater for use in a multi-star fiber optic communication network in order to avoid repeated signal return from star to star.

Continuing improvements in the transmission quality of optical fibers, and in particular increased bandwidth and reduced attentuation rates, have made optical fiber communication networks an increasingly attractive alternative to networks which employ conductors as the transmission medium. In order to communicate optically, an electrical signal developed within a transmitting terminal device such as, for example, a telephone, computer, or numerically controlled machine tool, is delivered to an optical transmitter within the terminal device. The optical transmitter uses the electrical signal to modulate light from a source such as an LED or a laser. The modulated light is then transmitted via an optical fiber to an optical receiver within a receiving terminal device. The optical receiver includes an optical detector, such as a photodiode, which reconverts the modulated optical signal into an electrical signal. Thus the optical transmitters and optical receivers within the terminal devices, together with the optical fibers connecting them, effectively replace conductors which might otherwise have been used. Optical fibers are particularly useful when digital data in serial form are to be transmitted.

A transmissive fiber optic star is a passive coupling device used to interconnect a number of terminal devices in a network. The physical structure of such a star is illustrated schematically in FIG. 1, wherein four optical fibers have been fused at a tapered region 20 to provide star 22 having light input ports 24, 26, 28, and 30 and light exit ports 32, 34, 36, and 38. LIght entering star 22 through any of the input ports 24-30 is equally distributed to all of the exit ports 32-38. For example, if light having an intensity of one unit were introduced into input port 24, light having an intensity of one-quarter unit (neglecting minor loses) would be emitted through each of exit ports 32-38. Star 22 could be used to interconnect four terminal devices, each terminal device being separately connected via optical fibers to one of the input ports and one of the exit ports.

Stars are not limited to four pairs of ports, as in the example of FIG. 1. However the number of terminal devices that can be interconnected via a single star is generally under 80. This limitation is caused partially by difficulties in fabricating larger stars (i.e., stars with more than 80 pairs of ports). Another limiting consideration is that the optical power available at each light exit port is inversely proportional to the total number of exit ports. Thus the available sensitivity of the optical receivers effectively imposes a limitation upon the star itself.

FIG. 2 schematically illustrates a fiber-optic communication network employing a star 40. In this Figure, terminal device 42 in Local Area A is connected to a light input port and a light exit port of star 40 by fibers 44 and 46, respectfully. Similarly, terminal devices 48 and 50 in Local Area B are connected to star 40 by fibers 52, 54, 56, and 58. Each terminal device has an optical transmitter which receives electrical signals in serial, digital form and transforms them into corresponding optical signals and an optical receiver which receives optical signals and transforms them back into electrical signals, although only transmitter 60 and receiver 62 in terminal device 42 are illustrated in the drawings. FIG. 3A illustrates a simple example of an optical transmitter which might be employed as transmitter 60. Input terminals 64 receives a digital signal in serial form. This signal is amplified by driver amplifier 66 and then provided to LED 68, which flashes ON and OFF in synchronism with the electrical code provided by the terminal device to terminal 64. These flashes enter the end of optical fiber 44. FIG. 3B illustrates a simple example of circuitry suitable for use as optical receiver 62. Flashes of light exiting the end of fiber 46 impinge upon an optical/electrical transducer such as photodiode 70. The output is amplified by amplifier 72 and provided to waveshaping circuit 74, such as an comparator or Schmidt trigger. Circuit 74 imparts sharp leading and trailing edges to the signal, which is provided to the terminal device via output terminal 76.

It should be noted that various sophisticated digital communication techniques which have been developed in the electrical communication art have been adapted for use in optical networks. Referring again to FIG. 2, it will be apparent that communication chaos would result if terminal devices 42, 48, and 50 were permitted to transmit simultaneously. This problem arises regardless of whether the transmission medium consists of conductors or optical fibers. Various network control systems have been developed to allow only one terminal device at a time access to the network for purposes of transmitting. For example in a poling system, a central network manager sequentially emits codes which identify each terminal device. If a terminal device has a message to send, it waits until it receives its identification code. In the token passing system, the function of the central network manager is distributed to the individual terminal devices. The identification codes are known as "tokens," and a terminal device having access to the network "passes the token" to the next terminal device entitled to access after sending any messages it may have. In the collision detection system, each terminal device monitors the network and is permitted to transmit at any time the network is not already in use. This occasionally results in simultaneous transmissions, and these "collisions" are detected by the transmitting terminal devices. The transmitting terminal devices then abort their transmissions and try again after a random delay. Such network control systems can be implemented electronically within the terminal devices connected to a fiber-optic network.

FIG. 2 illustrates a primary problem which is encountered in single star fiber-optic networks. If the terminal devices are widely dispersed, a large amount of fiber is required to run a separate pair of fibers from the star to each terminal device. This increases cabling complexity and network costs. For example if Local Area A represents a suite of offices in one building and Local Area B represents a suite of offices in a building a block away, an appreciable amount of fiber would be required to interconnect as few as ten terminal devices in Local Area A and another ten terminal devices in Local Area B. It will be apparent that, although the schematic symbol for star 40 might suggest that only four pairs of ports are present, which could be used to interconnect only four terminal devices, no such limitation is intended. As was mentioned above the capacity of the star is frequently significantly greater, and in practice star 40 would typically be used to interconnect more than the three terminal devices illustrated in FIG. 2.

Turning next to FIG. 4, one might attempt to reduce the amount of fiber required to interconnect a plurality of terminal devices in different local areas, such as terminal devices 78 and 80, by using a pair of stars 82 and 84, a light exit port of one star being optically connected to a light input port of the other star, and vice versa. However if star 84 had N pairs of ports, only 1/N of the optical power provided by terminal device 78 would be delivered to star 84. If star 84 also had N pairs of ports, it will be apparent that the optical power provided to terminal device 80 would be only $1/N^2$ of the optical power originally delivered by terminal device 78. The signal attenutaion would be even greater if there were more than two stars in the sequence.

In order to avoid this problem of signal attenuation, one might seek to insert repeaters 86 and 88 into the optical fibers connecting stars. Each such repeater would have an optical receiver portion (which might be the circuitry in FIG. 3B) to receive incoming optical signals and regenerate the original electrical signal, and an optical transmitter portion (such as the circuitry illustrated in FIG. 3A) to convert the regenerated signal back into optical form. This solution to the attenuation problem, unfortunately, would create its own problem. The optical output from repeater 86, for example, would be received by star 84 and distributed to each of its output ports, one of which is connected to repeater 88. Repeater 88 would launch the signal toward star 82, which would thereupon return it back to repeater 86. The result would be endless signal "reflection" between stars 82 and 84.

In order to avoid this reflection problem, one might electrically connect repeaters 86 and 88 so that they cannot both be operative simultaneously. FIG. 4 illustrates this expedient, with conductors 90 being used to transfer inhibit signals. Thus when a stream of light pulses is emitted from star 82 to star 84, for example, repeater 86 inhibits the operation of repeater 88 so that the reflection from star 84 is not transferred by repeater 88 back to star 82. Due to propagation delays, however, repeater 88 would become operative before it had received the tail end of the signal reflected by star 84. In order to ensure reliable operation it would be necessary to deactivate repeater 88 for an additional period following the period in which repeater 86 was operative. This increased delay would be significant if long fiber lengths are involved. Moreover, for signals propagating through repeater 88, a different period of deactivation might be required for repeater 86, since this would depend on the signal propagation time from repeater to repeater through star 82, which might be at a different distance from the repeaters than star 84.

The requirement to inhibit data transmission in one direction at the end of each message tends to complicate the use of repeaters. If the inhibit period is lengthened to a value corresponding to a specified maximum propagation time, then it is necessary to ensure that no terminal devices begin a new message during this extended inhibit period. This of course would complicate the network protocols employed in the network control system. Moreover, it might also be necessary to set different inhibit periods for each pair of repeaters, depending upon their location between the stars.

SUMMARY OF THE INVENTION

Accordingly, an object of the present invention is to provide a T-connection fiber-optic repeater for use in a multi-star fiber-optic network without subjecting the network to instability resulting from signal reflection between stars.

Another object of the present invention is to provide T-connection fiber-optic repeaters which are directly interconnected by fiber-optic transmission lines, so that signals pass from repeater to repeater without going through the stars. The stars are connected to the repeaters but are not directly connected to the optical fibers connecting the repeaters. This permits much greater repeater spacing within a given optical power output level and receiver sensitivity. It also permits the repeater to be a broadband device, so that digital signals passing through the repeater are not significantly changed in shape or duration.

Another object of the present invention is to provide a T-connection fiber-optic repeater which does not decode the signal waveform and which is applicable to a variety of data rates and network protocols with little or no modification needed to adapt the repeater for use in a particular fiber-optic network.

Another object of the present invention is to provide a T-connection fiber-optic repeater which produces minimal signal delay by employing simple signal processing with circuitry having a wide bandwidth.

Another object of the present invention is to provide a simple and consequently inexpensive repeater for use in fiber optic networks.

These and other objects can be attained by providing a T-connection fiber-optic repeater having first and second ports for reciving optical signals from other repeaters, third and fourth ports for emitting optical signals to other repeaters, and fifth and sixth ports for receiving optical signals from and delivering optical signals to terminal devices via an adjacent star connected to the fifth and sixth ports. An optical signal received at the first port, for example, is regenerated and launched toward the next repeater via the fourth port. The regenerated signal is also provided to the nearby star via the sixth port. The star reflects the signal back to the repeater via the fifth port, but the reflected signal is inhibited as long as the original signal is present at the first port. Since the repeater and star are physically close, the optical output at the sixth port and reflection at the fifth port are almost simultaneous, so that at most a modest additional inhibit period is needed. Moreover the inhibit period is not a function of the length of the optical fibers between repeaters.

The repeater can be modified to provide additional ports to meet special network demands, such as an unusually large number of terminal devices in a local area or a network which branches.

BRIEF DESCRIPTION OF THE DRAWINGS

FIG. 4 is a schematic diagram of a fiber-optic network having stars which are interconnected by repeaters, and is useful for describing problems which arise with such an interconnection;

FIG. 5 schematically illustrates a fiber-optic network employing the T-connection fiber-optic repeater of the present invention;

FIG. 9A schematically illustrates a fiber-optic network employing a T-connection fiber-optic repeater of the present invention modified to support more than one star;

FIG. 9B is a schematic block diagram of the modified repeater of FIG. 9A;

DESCRIPTION OF THE PREFERRED EMBODIMENTS

Figure 1:
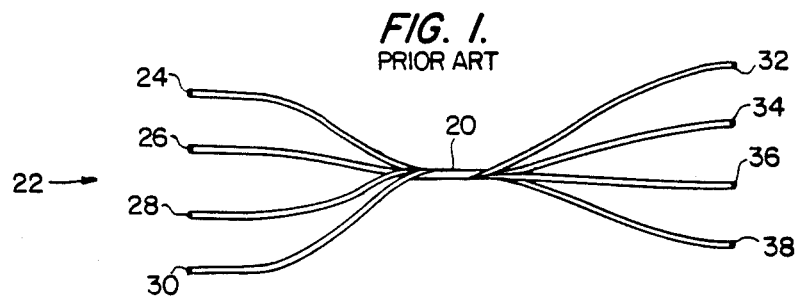
FIG. 1 is a plan view of a fiber-optic star having four light input ports and four light exit ports.
Figure 2:
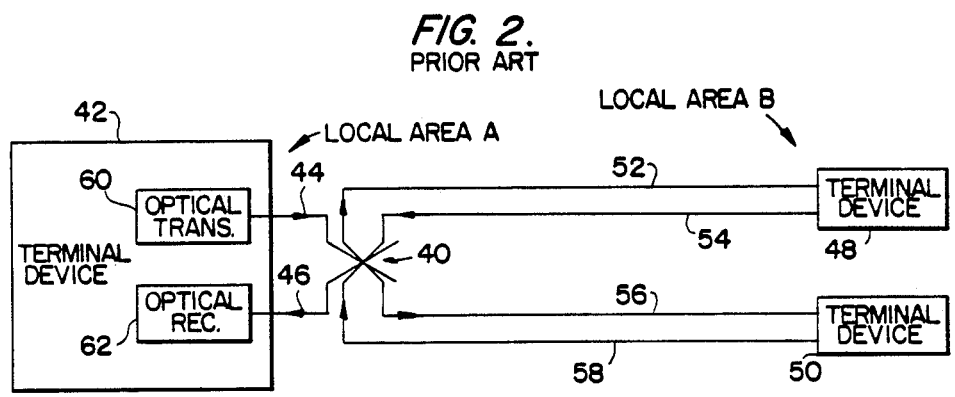
FIG. 2 is a schematic diagram illustrating a fiber-optic communication network utilizing a single star, the terminal devices which are interconnected by the star being disposed in different local areas.
Figure 3A:
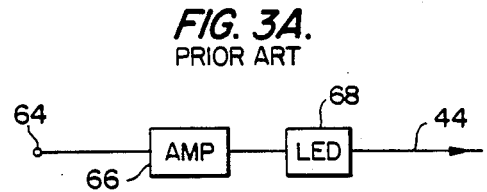
FIGS. 3A and 3B are schematic block diagrams illustrating respectively a simple optical transmitter and a simple optical receiver for coupling a terminal device to a fiber-optic network.
Figure 3B:
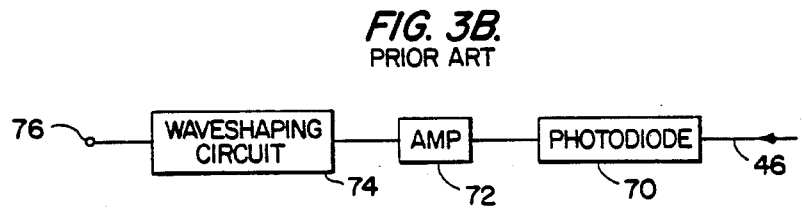

In FIG. 5, T-connection fiber-optic repeaters 92, 94, and 96 of the present invention are interconnected by optical fibers 98, 100, 102, and 104. Optical fibers 106, 108, and 110 connect repeaters 92-96 to a light exit port of each of stars 112, 114, and 116. Similarily, optical fibers 118, 120, and 122 connect repeaters 92-96 to light input ports of stars 112-116. Each of stars 112-116 is also optically connected to a plurality of terminal devices, although only terminal devices 124, 126, and 128 are illustrated in the drawings. Repeaters 92-96 and their corresponding stars 112-116, respectively, may be positioned in different local areas which are separated by large distances. However each repeater is located close to its corresponding star, and in this context "close" means less than one kilometer. However, the repeaters and their corresponding stars are preferably located much closer than that; for example, repeater 94 and star 114 might be housed in the same enclosure, in which case the total length of fibers 108 and 120 might be one or two meters or even less.

A message emitted by a terminal device 124, for example, would be distributed to other terminal devices (not illustrated) in the same local area by star 112. Fiber 106 would also convey the message to repeater 92, which transfers the message upstream to repeater 94 via fiber 98. In turn, repeater 94 transfers the message further upstream to repeater 96 via fiber 100 and to star 114 via fiber 120. Star 114 distributes the message to terminal devices in the local area, such as terminal device 126. A message originated by terminal device 128, for example, would be conveyed downstream to repeater 94 via star 116, fiber 110, repeater 96, and fiber 102. Repeater 94 conveys the message further downstream via fiber 104, and, via fiber 120, to star 114 for distribution to terminal devices in the local area, such as terminal device 126. Finally, a message originated by terminal device 126 would be conveyed via star 114 and fiber 108 to repeater 94, which transmits the message upstream via fiber 100 and downstream via fiber 104. The optical communication network illustrated in FIG. 5 preferably employs a network control system such as token passing or collision detection to control access ot the terminal devices to the network.

From the foregoing discussion it will be apparent that each of repeaters 92-96 is equipped to receive messages headed in the upstream direction and transmit them further upstream to the next repeater, and to receive messages headed in the downstream direction and transmit them further downstream. Each repeater also provides these messages to its corresponding star for subsequent distribution to terminal devices connected thereto. Each repeater also transmits messages received from the corresponding star in the both the upstream and downstream directions.

The fact that each repeater is located physically close to its corresponding star means that a signal provided to the corresponding star is reflected back to the repeater almost immediately. For example, a signal travelling upstream on fiber 98 would be distributed by repeater 94 to fiber 100 and fiber 120. The signal applied to fiber 120 would be almost immediately reflected by star 114 back to repeater 94 via fiber 108. It will be apparent that the reflected signal from star 114 is almost simultaneous with the original signal from fiber 98, so that the original signal can be used to inhibit the reflected signal, without the need of an extended inhibit period to compensate for delayed reflections received from distant stars. A circuit for accomplishing this operation is illustrated in FIG. 6.

Figure 6:
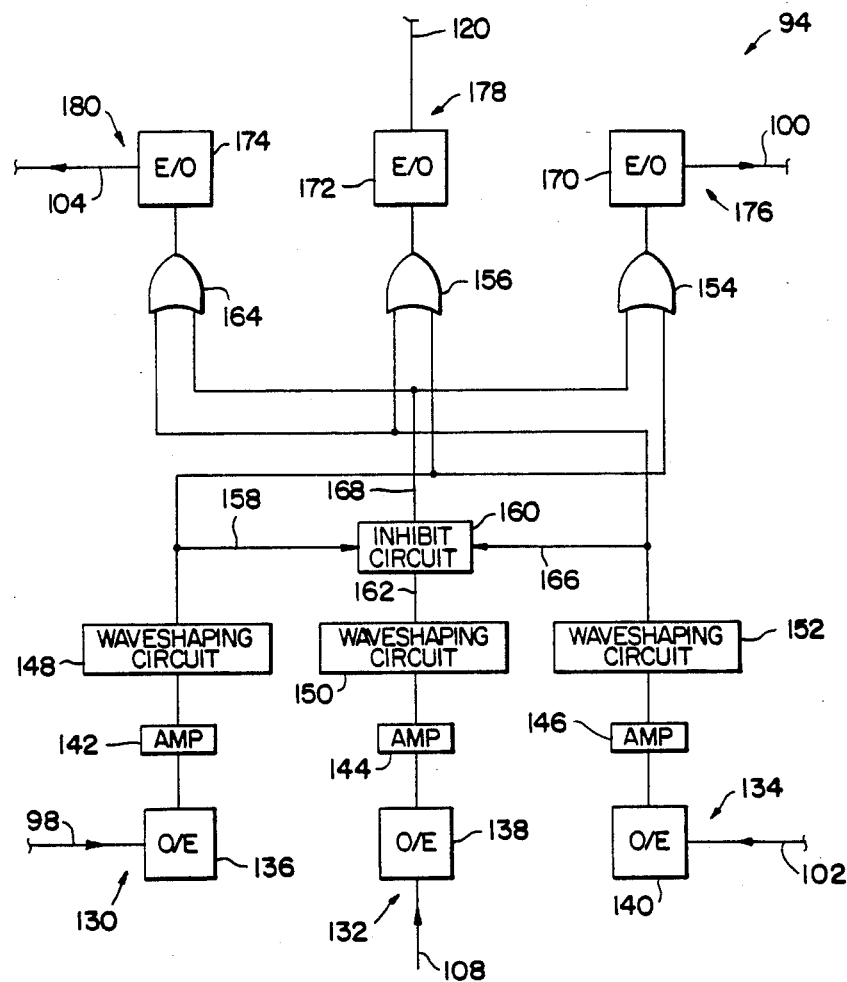
FIG. 6 is a schematic block diagram illustrating circuitry which can be employed in a T-connection fiber-optic repeater according to the present invention.

In FIG. 6, light enters repeater 94 via an upstream light entry port 130, a star light entry port 132, and a downstream light entry port 134. The incoming light impinges upon optical/electrical transducers 136, 138, and 140, such as photodiodes. Transducers 136-140 convert the light into electrical signals, which are amplified by amplifiers 142-146. The outputs of amplifiers 142-146 are provided to waveshaping circuits 148, 150, and 152, which limit the amplified signals and provide sharp leading and trailing transitions. Such devices as Schmidt triggers, comparators, or long-tailed pairs might be employed for circuits 148-152. The output of circuit 148 is provided to one input of each of OR gates 154 and 156. The output is also provided, via conductor 158, to inhibit circuit 160. Conductor 162 conveys the output of circuit 150 to inhibit circuit 160. The output of circuit 152 is conveyed to one input of each of OR gates 164 and 156 and, via conductor 166, to inhibit circuit 160. The output of inhibit circuit 160 is conveyed, via conductor 168, to an input of each of OR gates 154 and 164. The outputs of OR gates 154, 156 and 164 are connected, respectively, to electrical/optical transducers 170, 172, and 174. Transducers 170-174 may be LEDs or lasers. Transducers 170-174 emit light at upstream light exit port 176, star light exit port 178, and downstream light exit port 180, respectively.

With continuing reference to FIG. 6, the operation of the T-connection fiber optic repeater of the present invention will now be described. An optical signal entering upstream light entry port 130, for example, is converted to a corresponding digital signal by transducer 136, amplifier 142, and waveshaping circuit 148. This electrical signal is provided to gates 154 and 156, which turn ON. Transducers 170 and 172 convert the signal back to optical form and emit it at upstream light exit port 176 and star light exit port 178. The optical signal from star light exit port 178 reappears almost imemdiately at star light entry port 132 and is converted to an electricla signal, amplified, and shaped by transducer 138, amplifier 144, and waveshaping circuit 150. However inhibit circuit 160 does not permit the electrical signal to proceed to gates 154 and 164.

While the foregoing discussion has concentrated on the effect of an optical signal which enters repeater 94 via upstream light entry port 130, it will be apparent from FIG. 6 that similar operation would result when light enters via downstream light entry port 134.

With continuing reference to FIG. 6, the output of waveshaping circuit 150, unless inhibited by a signal on conductor 158 or 166, is delivered to gates 154 and 156, so that corresponding optical signals are emitted via upstream light exit port 176 and downstream light exit port 180 but not by star light exit port 178. Thus a signal from the star via port 132 is not conveyed back to the star via port 178.

Figure 7:
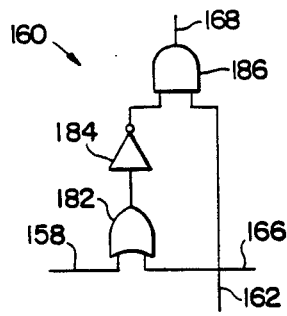
FIG. 7 is a schematic diagram of circuitry which can be employed for the inhibit circuit of FIG. 6.
Figure 8:
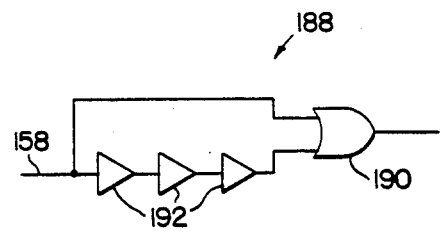
FIG. 8 is a schematic diagram of a pulse stretching circuit which can be used in conjunction with the inhibit circuit of FIG. 7.

Turning next to FIG. 7, inhibit circuit 160 includes an OR gate 182 having conductors 158 and 166 as inputs. The output of gate 182 is inverted by inverter 184 and supplied as an input to AND gate 186, which also receives the signal on conductor 162 as an input. Accordingly, it will be apparent that when optical signals are not being received at either of upstream or downstream light entry ports 130 and 134, inverter 184 is ON and any signal appearing on conductor 162 is passed to conductor 168 by AND gate 186. On the other hand each time a pulse of light entering either of upstream or downstream light entry ports 130 and 134 is converted to an electrical "one" on conductor 158 or 166, inverter 184 turns OFF to prevent the electrical equivalent of the optical signal which has been reflected into star light entry port 132 from being conveyed to conductor 168. This reflection, as has been noted, is almost instantaneous, so that conductor 162 goes to "one" very briefly after conductor 158 or 166 goes to "one." Similarily, the "one" may linger on conductor 162 very briefly after inverter 184 turns ON. This phenomenon, which occurs at the trailing edges of the optical light pulses, is normally expected to be briefer than the reaction times of gate 186, gates 154 and 164, and transducers 176 and 174, so that it causes no trouble. In some situations, however, it may be desirable to briefly delay the time when inverter 184 turns ON. In order to accomplish such a delay, the outputs of waveshaping circuits 148 and 152 may be connected to the inputs of gate 182 by pulse stretchers 188, as illustrated in FIG. 8. In FIG. 8 an electrical "one" on conductor 158, for example, immediately turns OR gate 190 ON. The propagation delay through a series of buffers 192 keeps gate 190 ON briefly after the signal has disappeared from conductor 158. If further delay is needed, an RC delay network may be connected from a point between a pair of buffers 192 and ground.

The circuitry of FIG. 6 is suitable for use in a T-connection fiber-optic repeater that is disposed between two other repeaters in a sequence. The end repeaters of the sequence, however, can be simplified. For exmaple if a repeater were the last downstream repeater in a sequence, so that signals would not be received from further downstream and need not be transmitted further downstream, downstream light entry port 134 and downstream light exit port 180 would be unnecessary, along with the associated electrical components.

The circuitry of FIG. 6 may be modified in various ways in order to accommodate the demands placed upon the optical network in which it is used. In FIG. 9A, for example, it is assumed that there are a large number of terminal devices in the local area supported by repeater 194, so two stars 196 and 198 are provided. In FIG. 9A repeater 194 is optically connected to repeater 200 by fibers 202 and 204 and to repeater 206 by fibers 208 and 210. Fibers 212 and 213 convey optical signals from stars 196 and 198, respectively, to repeater 194, and fibers 214 and 215 convey optical signals from repeater 194 to stars 196 and 198, respectively. The modification of the circuitry in FIG. 6 that is necessary in order to permit repeater 194 to support two stars basically consist of duplicating the central column of components (that is, elements 138, 144, 150, 160, 156, and 172 in FIG. 6) and modifying the interconnection amongst the columns. Such modifications are illustrated in FIG. 9B.

In FIG. 9B, light from fiber 104 is received at upstream light entry port 216; light from first star 196 is received at first star entry port 218; light from second star 198 is received at second star entry port 220; and light from fiber 208 is received at downstream light entry port 222. Light is emitted by repeater 194 to fiber 202 at downstream light exit port 224; light is emitted to first star 196 at first star exit port 226; light is emitted to second star 198 at second star exit port 228; and light is emitted to fiber 210 at upstream light exit port 230. Optical/electrical transducers 232, 234, 236, and 238 receive the light exiting fibers 204, 212, 213, and 208, respectively. The electrical output of transducers 232-238 is amplified by amplifiers 240, 242, 244, and 246, respectively. The output signals of amplifiers 240-246 are shaped by waveshaping circuits 248, 250, 252, and 254, respectively. The output of waveshaping circuit 248 is supplied to one input of each of OR-gates 256, 258, and 260. The output of circuit 248 is also supplied to an input of each of inhibit circuits 264 and 266. Inhibit circuits 264-266 may be configured as is illustrated in FIG. 7, although pulse stretchers as in FIG. 8 may be employed to stretch the signals from waveshaping circuits 248 and 254. The output of inhibit circuit 264 is supplied to one input of each of OR-gates 268, 258, and 260, while the output of inhibit circuit 266 is supplied to one input of each of OR-gates 268, 256, and 260. Electrical/optical transducers 270, 272, 274, and 276 are connected to the outputs of gates 268, 256, 258, and 260, respectively.

With continuing reference to FIGS. 9A and 9B, it will be apparent that a signal traveling upstream from repeater 200, for example, enters repeater 194 at upstream light entry port 216. After the optical signal is converted to an electrical signal, amplified, and shaped, gates 256, 258, and 260 turn ON, so that optical signals are emitted at first and second star exit ports 226 and 228 and at upstream light exit port 230. The signal from waveshaping circuit 248 is also applied to inhibit circuits 264 and 266, thereby preventing instability arising from signal reflection by stars 196 and 198. It will be apparent from the symmetry of FIG. 9B that similar operation occurs when a signal is received at downstream light entry port 222.

With continuing reference to FIGS. 9A and 9B, an optical signal entering first star entry port 218, for example, is converted to electrical form, amplified, and shaped before reaching inhibit circuit 264. Unless a signal is present at port 216 or 222, the signal from waveshaping circuit 250 turns gates 268, 258, and 226 ON, so that optical signals are emitted at downstream light exit port 224, upstream light exit port 230, and second star exit port 228. Thus a message emitted by terminal device (not illustrated) connected to first star 196 is provided to second star 198, in addition to being propagated in the upstream and downstream directions. It will be apparent from the symmetry of FIG. 9B that similar operation occurs when an optical signal enters second star entry port 220.

Figure 10A:
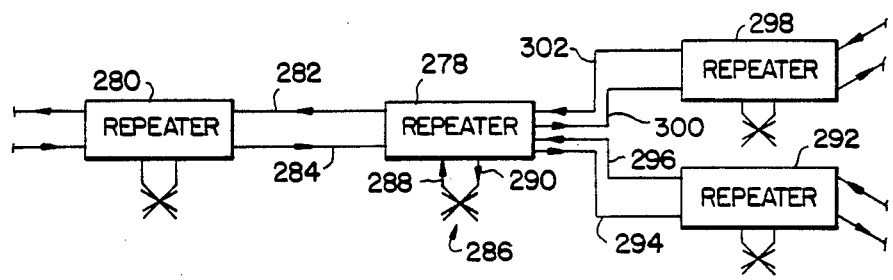
FIG. 10A schematically illustrates a fiber-optic network employing a T-connection fiber-optic repeater of the present invention modified to permit a branching network.

It may also be desirable to modify the circuitry illustrated in FIG. 6 in order to permit an optical communication network to branch, as is illustrated in FIG. 10A. Repeater 278 is connected to repeater 280 by fibers 282 and 284; to star 286 by fibers 288 and 290; to repeater 292 by fibers 294 and 296; and repeater 298 by fibers 300 and 302. The modifications to the circuitry of FIG. 6 which permit repeater 278 to accommodate a branch in the optical network on one side thereof basically include duplicating the column of components on that side and modifying the interconnections among components. This is illustrated in FIG. 10B.

Figure 10B:
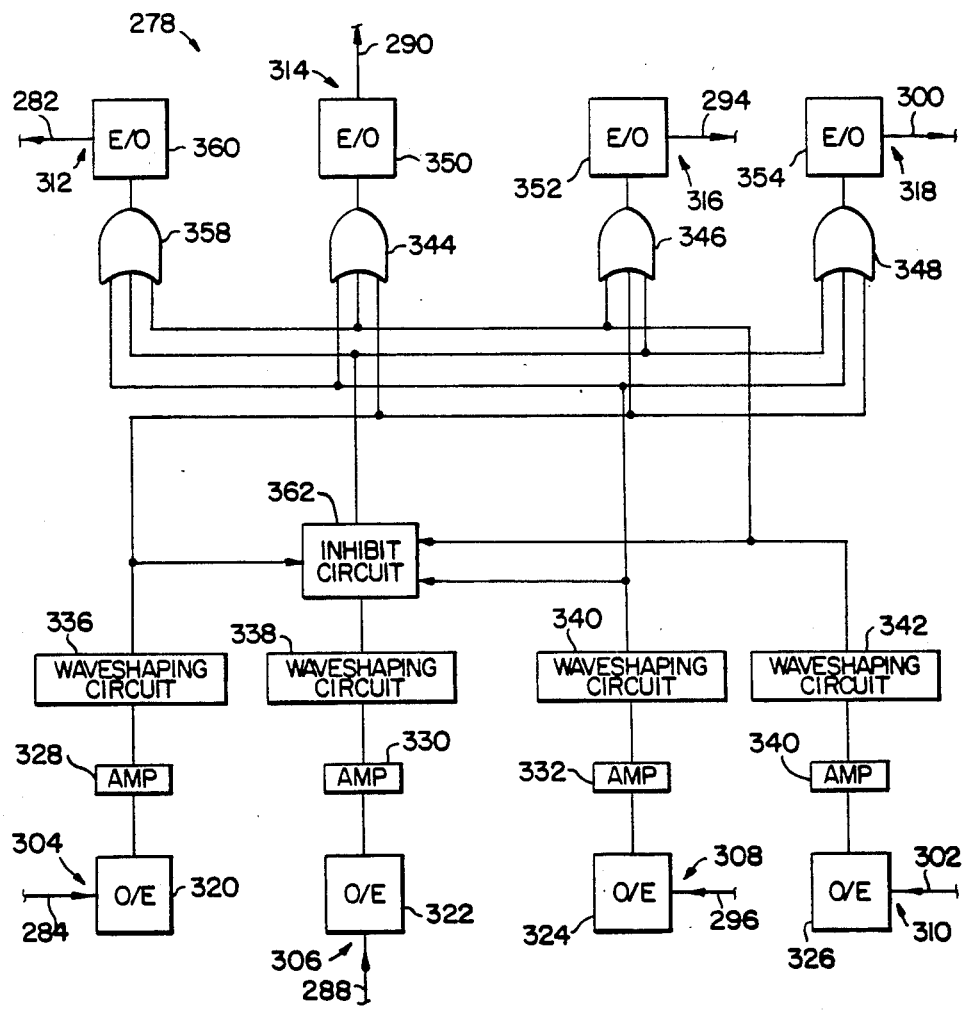
FIG. 10B is a schematic block diagram of the modified repeater of FIG. 10A.

In FIG. 10B, light enters repeater 278 at upstream light entry port 304, star entry port 306, firt downstream light entry port 308, and second downstream light entry port 310. Light exits repeater 278 at downstream light exit port 312, star exit port 314, first upstream light exit port 316, and second upstream light exit port 318. Optical signals entering ports 304-310 are converted to electrical form by optical/electrical transducers 320, 322, 324, and 326, respectively, amplified by amplifiers 328, 330, 332, and 340, respectively, and shaped by waveshaping circuits 336, 338, 340, and 342, respectively. It will be apparent from Figure 10B that an optical signal entering upstream light entry port 304, for example, causes OR-gates 344, 346, entry 48 to turn ON, thereby causing electrical/optical transducers 350, 352, and 354 to emit light via star exit port 314, first upstream light exit port 316, and second upstream light exit port 318. OR-gate 358 does not turn ON, so that electrical/optical transducer 360 does not emit an optical signal via downstream light entry port 312. The output of waveshaping circuit 336 is also applied to an input of inhibit circuit 362, thereby avoiding unwanted reflections which enter star entry port 306 from star 286. Circuit 362 may be configured as is illustrated in FIG. 7, except that gate 182 would have an additional input to accommodate the additional branch of the optical network of FIG. 10A. The inputs applied to circuit 362 from circuits 336, 340, and 342 may be stretched in the manner previously discussed, if necessary.

With continuing reference to FIG. 10B, it will be apparent that an optical input at first downstream light entry port 308 results in a corresponding output at downstream light exit port 312, star exit port 314, and second upstream light exit port 318. Similarly, an optical input applied to second downstream light entry port 310 would result in corresponding optical outputs at all of the light exit ports except second upstream light exit port 318.

From the foregoing discussion it will be apparent that the T-connection fiber-optic repeater of the present invention adds gain while avoiding the problems associated with signal reflection in multi-star fiber-optic networks. Each repeater is used in conjunction with a nearby star but is connected in the network so that optical signals can proceed from repeater to repeater without going through stars. The signals which pass from repeater to repeater are used to gate signals from the stars so that reflection loops are not formed. Modified embodiments permit one repeater to support a plurality of stars and permit optical networks having branches.

It will be understood that the above description of the present invention is susceptible to various modifications, changes, and adaptations, and the same are intended to be comprehended within the meaning and range of equivalents of the appended claims.

What I claim is:

1. A T-connection fiber-optic repeater for use in a multi-star fiber-optic network, comprising:
    first receiving means for receiving optical signals from a device at a first location and generating electrical signals corresponding thereto;
    second receiving means for receiving optical signals from a star at a second location and generating electrical signals corresponding thereto;
    third receiving means for receiving optical signals from a device at a third location and generating electrical signals corresponding thereto;
    first transmitting means responsive to said electrical signals generated by said first and third receiving means for emitting optical signals to said star when said first or third receiving means receives optical signals;
    second transmitting means responsive to said electrical signals generated by said second and third receiving means for emitting optical signals to said device at said first location when said second or third receiving means receives optical signals;
    third transmitting means responsive to said electrical signals generated by said first and second receiving means for emitting optical signals to said device at said third location when said first or second receiving means receives optical signals; and
    inhibit means connected to said first, second, and third receiving means for inhibiting said second and third transmitting means from responding to said electrical signals generated by said second receiving means whenever said first or third receiving means receives optical signals.

2. The repeater of claim 1, wherein said first receiving means comprises an optical/electrical transducer and a waveshaping circuit, wherein said second receiving means comprises an optical/electrical transducer and a waveshaping circuit, and wherein said first and second transmitting means comprise first and second electrical/optical transducers, respectively.

3. The repeater of claim 2, wherein said electrical/optical transducers comprise LEDs.

4. The repeater of claim 2, wherein said optical/electrical transducers comprise photodiodes, and wherein said first receiving means and said second receiving means each additionally comprise means for amplifying the outputs of said photodiodes.

5. The repeater of claim 1, wherein said second location is closer than said first location to said repeater.

6. The repeater of claim 1, wherein said second location is less than ten meters from said repeater.

7. The repeater of claim 1, wherein said second location is substantially closer than said first or third locations to said repeater, wherein said device at said first location is another repeater, and wherein said device at said third locations is a further repeater.

8. The repeater of claim 1, wherein said first, second, and third receiving means each comprise an optical/electrical transducer and a waveshaping circuit.

9. The repeater of claim 8, wherein said optical/electrical transducers are photodiodes, and wherein said first, second, and third receiving means additionally comprise means for amplifying the outputs of the photodiodes.

10. The repeater of claim 8, wherein said first, second, and third transmitting means are LEDs.

11. The repeater of claim 8, further comprising a first gate having a first input connected to receive the electrical signals generated by said third receiving means, a second input connected to said inhibit means, and an output connected to said second transmitting means.

12. The repeater of claim 11, further comprising a second gate having a first input connected to receive the electrical signals generated by said third receiving means, a second input connected to receive the electrical signals generated by said first receiving means, and an output connected to said first transmitting means.

13. The repeater of claim 12, further comprising a third gate having a first input connected to receive the electrical signals generated by said first receiving means, a second input connected to said inhibit means, and an output connected to said third transmitting means.

14. The repeater of claim 13, wherein said gates are OR-gates.

15. The repeater of claim 12, wherein said inhibit means comprises means for OR-ing the electrical signals generated by said first and third receiving means, and a fourth gate having a first input responsive to said means for OR-ing, a second input connected to receive the electrical signals generated by said second receiving means, and an output, one input of each of the first and third gates being responsive to the output of said fourth gate.

16. The repeater of claim 15, further comprising means connecting said first and third receiving means to said means for OR-ing for stretching the electrical signals generated by said first and third receiving means.

17. The repeater of claim 1, further comprising fourth transmitting means responsive to said electrical signals generated by said first and third receiving means for emitting optical signals to an additional star at said second location whenever said first or third receiving means receives optical signals, said foruth transmitting means additionally being reponsive to said electrical signals generated by said second receiving means unless inhibited by said inhibit means; fourth receiving means for receiving optical signals from said additional star and generating electrical signals corresponding thereto, said first, second, and third transmitting means additionally being responsive to said electrical signals generated by said fourth receiving means; and an additional inhibit means connected to said first and third receiving means for inhibiting said first, second, and third transmitting means from responding to said electrical signals generated by said fourth receiving means when said first and third receiving means receives optical signals.

18. The repeater of claim 17, further comprising a gate having inputs connected to said third receiving means, said inhibit means, and said additional inhibit means, and having an output connected to said second transmitting means; a gate having inputs connected to said first receiving means, said third receiving means, and said additional inhibit means, and having an output connected to said first transmitting means; a gate having inputs connected to said first receiving means, said third receiving means, and said inhibit means, and having an output connected to said fourth transmitting means; and a gate having inputs connected to said first receiving means, said inhibit means, and said additional inhibit means, and having an output connected to said third transmitting means.

19. The repeater of claim 17, wherein said second location is between said first and third locations, and wherein the distance between said second location and said repeater is less than the distance between either or said repeater and said first location and said repeater and said third location.

20. The repeater of claim 1, further comprising fourth receiving means connected to said inhibit means for receiving optical signals from a device at a fourth location and generating electrical signals corresponding thereto; and fourth transmitting means responsive to said electrical signals generated by said first and third receiving means for emitting optical signals to said device at said fourth location whenever said first or third receiving means receives optical signals, said fourth transmitting means additionally being responsive to said electrical signals generated by said second receiving means unless inhibited by said inhibit means.

21. The repeater of claim 20, further comprising a gate having inputs connected to said third receiving means, said fourth receiving means, and said inhibit means, and an output connected to said second tranmsitting means; a gate having inputs connected to said first, third, and fourth receiving means, and having an output connected to said first transmitting means; a gate having inputs connected to said first receiving means, said fourth receiving means, and said inhibit means, and having an output connected to said third transmitting means; and a gate having inputs connected to said first receiving means, said third receiving means, and said inhibit means, and having an output connected to said fourth transmitting means.

22. A T-connection fiber-optic repeater comprising:
first receiving means for receiving optical signals from a device at a first location and generating electrical signals corresponding thereto;
second receiving means for receiving optical signals from a star at a second location and generating electrical signals corresponding thereto;
third receiving means for receiving optical signals from a device at a third location and generating electrical signals corresponding thereto;
inhibit circuit means connected to said first, second, and third receiving means for generating gates signals by gating the electrical signals generated by said second receiving means in response to the electrical signals generated by said first or third receiving means;
first electrical/optical transducer means for emitting optical signals to said star;
second electrical optical transducer means for emitting optical signals to said device at said first location;
third electrical/optical transducer means for emitting optical signals to said device at said third location;
a first gate having inputs responsive to the electrical signals generated by said third receiving means and the gated signals generated by said inhibit circuit means and having an output to which said second electrical/optical transducer means is responsive;
a second gate having inputs responsive to the electrical signals generated by said first and third receiving means and having an output to which said first electrical/optical transducer means is responsive; and a third gate having inputs responsive to the gated signals generated by said inhibit circuit means and the electrical signals generated by said first receiving means and having an output to which said third electrical/optical transducer means is responsive.

23. The repeater of claim 22, wherein said inhibit circuit means comprises means for OR-ing the electrical signals generated by said first and third receiving means, and means responsive to said OR-ing means for gating the output of said second receiving means.

24. The repeater of claim 22, wherein said inhibit circuit means comprises first pulse stretcher means for stretching the electrical signals generated by said first receiving means to provide first stretched signals, second pulse stretcher means for stretching the electrical signals generated by said third receiving means to provide second stretched signals, means for OR-ing the first and second stretched signals, and a gate having a first input responsive to said means for OR-ing and a second input connected to receive the signals generated by said second receiving means.

25. The repeater of claim 22, further comprising: fourth receiving means for receiving optical signals from an additional star at said second location and generating electrical signals corresponding thereto; additional inhibit circuit means connected to said first, third, and fourth receiving means for gating the electrical signals generated by said fourth receiving means in response to the electrical signals generated by said first or third receiving means, said first, second, and third gates additionally having inputs responsive to said additional inhibit circuit means; a fourth gate having an output and having inputs responsive to said first and third receiving means and to said inhibit circuit means; and fourth electrical/optical transducer means connected to the output of said fourth gate for emitting optical signals to said additional star.

26. The repeater of claim 22, further comprising: fourth receiving means for receiving optical signals from a device at a fourth location and generating electrical signals corresponding thereto, said inhibit circuit means additionally being connected to said fourth receiving means and gating the electrical signals generated by said second receiving means in response to the electrical signals generated by said fourth receiving means, said first, second, and third gates additionally having inputs responsive to the electrical signals generated by said fourth receiving means; a fourth gate having an output and having inputs responsive to said first and third receiving means and to said inhibit circuit means; and fourth electrical/optical transducer means connected to the output of said fourth gate for emitting optical signals to said device at said fourth location.

* * * * *